April 5, 1966   D. V. BENFER ETAL   3,243,846
MEANS FOR PROVIDING STRAIN-RELIEF HOLES IN TAPE CABLE
Filed March 26, 1962   2 Sheets-Sheet 1
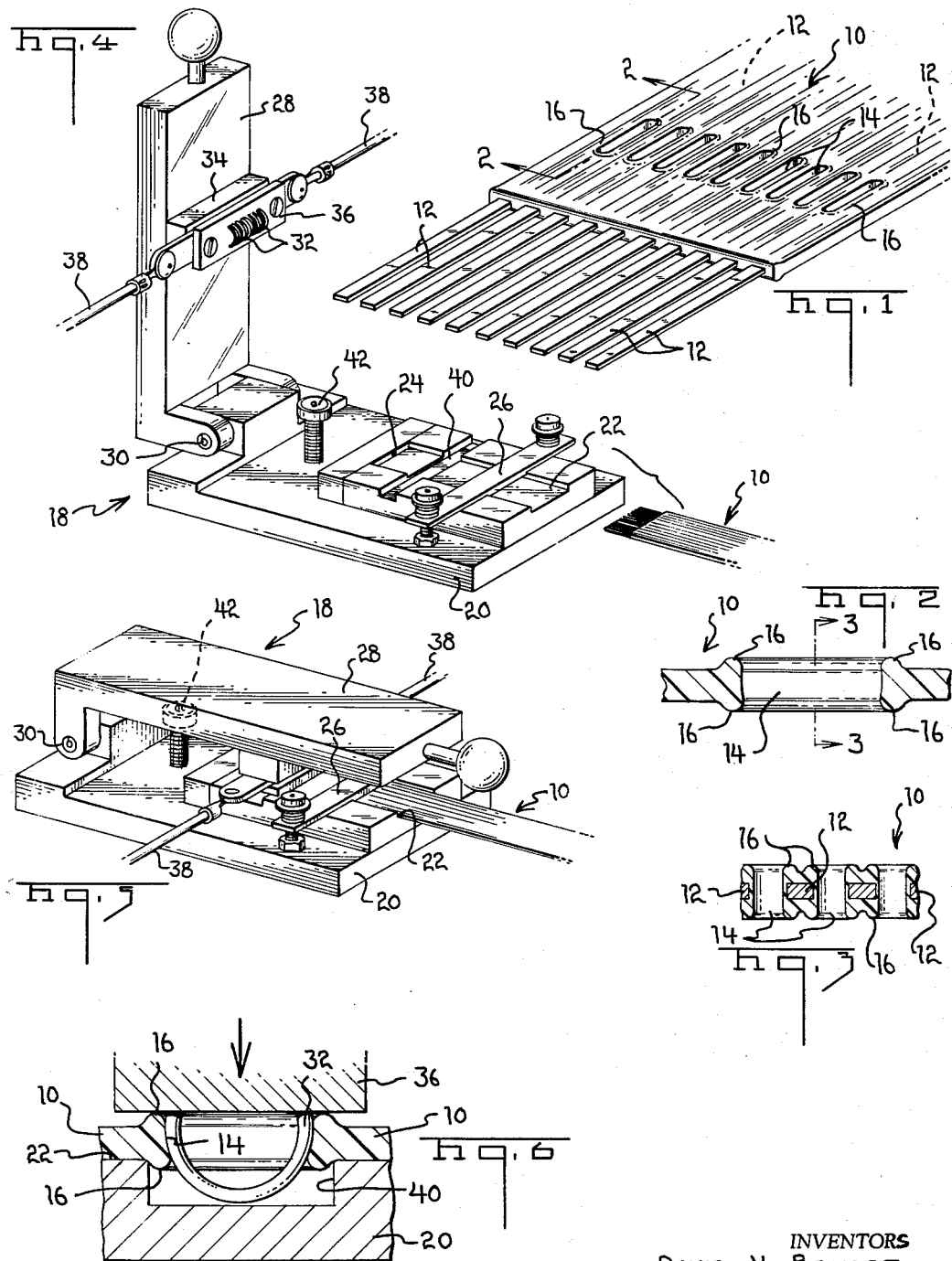
INVENTORS
DAVID V. BENFER
BY WILBUR Y. HARDEMAN
Curtis, Morris and Safford April 5, 1966     D. V. BENFER ETAL     3,243,846
MEANS FOR PROVIDING STRAIN-RELIEF HOLES IN TAPE CABLE
Filed March 26, 1962     2 Sheets-Sheet 2
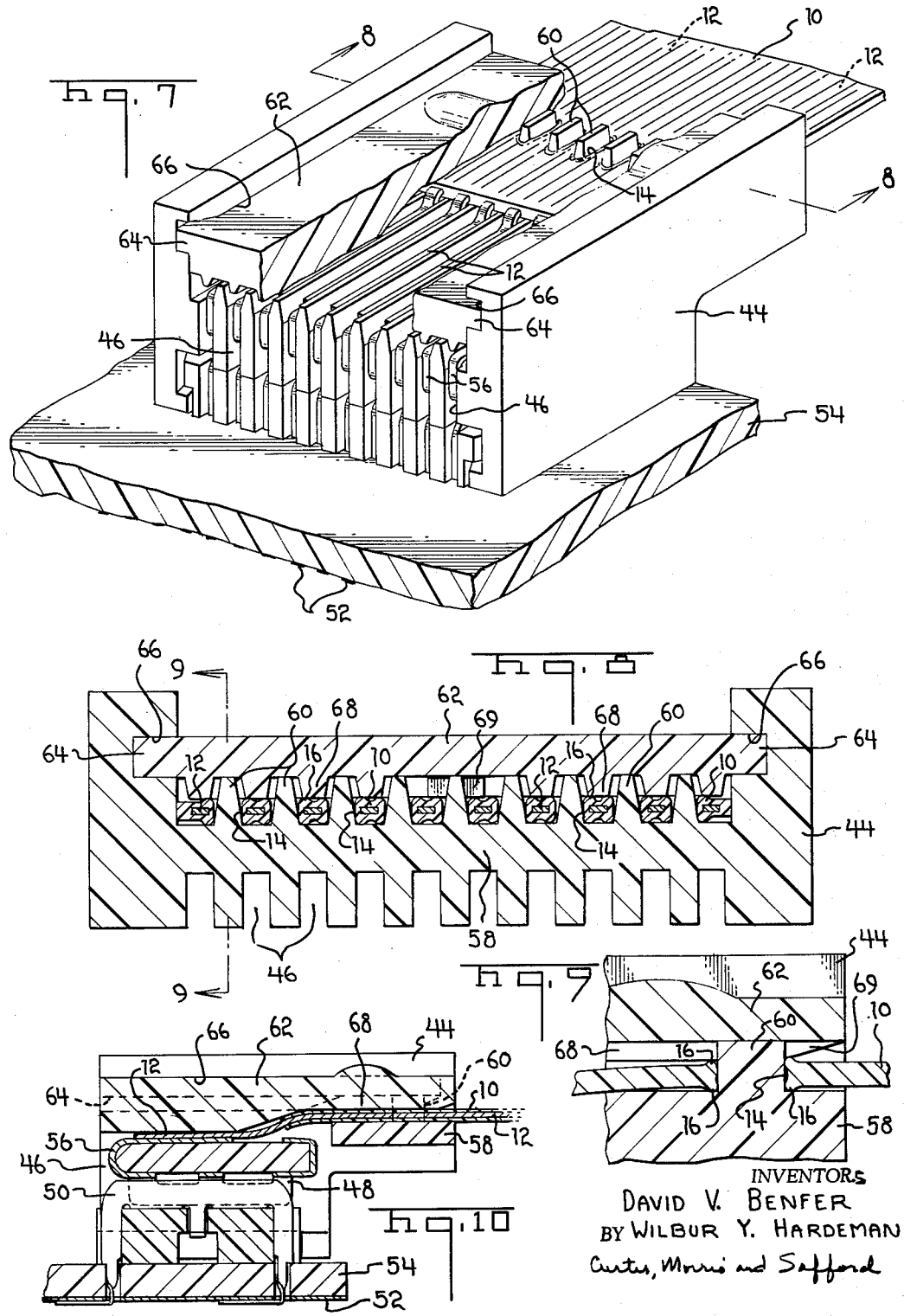
INVENTORS
DAVID V. BENFER
BY WILBUR Y. HARDEMAN
Curtis, Morris and Safford United States Patent Office 3,243,846
Patented Apr. 5, 1966

3,243,846
MEANS FOR PROVIDING STRAIN-RELIEF HOLES IN TAPE CABLE
David V. Benfer, Marysville, and Wilbur Y. Hardeman, Mechanicsburg, Pa., assignors to AMP Incorporated, Harrisburg, Pa.
Filed Mar. 26, 1962, Ser. No. 182,217
2 Claims. (Cl. 18—5)

This invention relates to improvements in means to connect flat electric cable to certain items, such as a housing, and to provide strain-relief means between the cable and housing so as to prevent damage to the connection between said housing and cable, either through flexing, exertion of longitudinal tension, or the like. The invention also relates to a method of forming such strain-relief means, and mechanism by which the same is formed.

In many different types of electrical circuitry extensively used at present, the capacity of the electric conductors need only be very small, whereby the cross-sectional dimension of the conductors correspondingly is small. Accordingly, a substantial number of such conductors can be arranged in insulated and protected condition within a cable that conveniently may be flat and of substantially uniform thickness and width. The conductors can be arranged therein parallel to each other and transversely spaced, said conductors preferably being metallic strips and at least partially, if not completely, embedded within and covered by a suitable molded or extruded strip of appropriate synthetic resin, which, preferably, is flexible. However, the present invention is not restricted to application to cables or conductors which are flexible.

Especially when cables of the type referred to above are of very thin dimensions and include a substantial number of very thin and narrow electrical conductors disposed in side-by-side, but transversely spaced, relationship, difficulty has been experienced heretofore when attempting to connect said cable, and particularly the conductors thereof, to other electrical elements, such as a corresponding series of spaced contacts arranged within a housing, and which contacts are to be connected electrically, respectively, to the conductors of the cable.

While it is not particularly difficult to firmly clamp a cable containing a plurality of small sized conductors to a housing, such as by engaging the opposite surfaces of the cable with suitable pressure, it is, nevertheless, difficult to effect a suitable clamp of this nature which will have adequate strength to resist reasonable longitudinal tension exerted upon the cable, without introducing the danger of rupturing one or more of the conductors in the cable.

Thought has been given heretofore to provide strain-relief means between a cable and a housing, for example, by roughening or notching the cable to receive complementary means provided in the housing. Any such roughening or notching of the cable, however, serves to weaken the same, due to the cross-sectional dimension of the cable at the notched or roughened area being less than the cross-sectional dimension elsewhere. Accordingly, the cable then is less able to sustain longitudinal tension than originally; and, further, such roughening or notching likewise weakens the cable to withstand flexing conditions when subjected thereto.

Still a further object of the invention is to provide mechanism to perform the aforementioned method comprising the invention in order to produce the portions of the strain-relief means formed in the cable, as set forth hereinabove.

Details of the foregoing objects and of the invention are described in the following specification and illustrated in the accompanying drawings comprising a part thereof.

In the drawings:

FIGURE 1 is a perspective view of a fragmentary end portion of a flat cable embodying portions of strain-relief means formed in accordance with the present invention;

FIGURE 2 is a fragmentary vertical sectional view taken on the line 2—2 of FIGURE 1 and illustrating, on a larger scale than used in FIGURE 1, details of one of the strain-relief means formed in the cable shown in FIGURE 1;

FIGURE 3 is a fragmentary vertical sectional view taken on the line 3—3 of FIGURE 2, and illustrating the shape of the strain-relief means formed in the cable, as viewed at a right angle to the view shown in FIGURE 2;

FIGURE 4 is a perspective view of mechanism adapted to form in the cable shown in FIGURE 1, the portions of the strain-relief means embodied in said cable, said mechanism being illustrated in open position, and in exploded manner, showing a fragmentary end portion of a cable in position to be placed in the mechanism for the forming of strain-relief means therein;

FIGURE 5 is a view similar to FIGURE 4, but illustrating the fragmentary portion of a flat cable fully positioned operatively within the mechanism which is shown in closed, operative position;

FIGURE 6 is an enlarged, fragmentary vertical sectional view showing the details of a fusing element of the mechanism illustrated in FIGURES 4 and 5 positioned relative to the cable disposed in the mechanism at the conclusion of forming the strain-relief means in said cable;

FIGURE 7 is a perspective view of a fragmentary end portion of a flat cable connected to a housing, said connected elements employing interfitting strain-relief means embodying principles of the present invention, parts of the housing being broken away to illustrate certain details of the invention, as well as other aspects of said housing and additional circuit means connected thereto;

FIGURE 8 is a vertical sectional elevation taken on the line 8—8 of FIGURE 7 and illustrating, on a larger scale than employed in FIGURE 7, details of the strain-relief means disposed in the connected cable and housing elements;

FIGURE 9 is a fragmentary vertical elevation, as seen on the line 9—9 of FIGURE 8, showing details of latch means for certain elements of the housing illustrated in FIGURES 7 and 8; and FIGURE 10 is a vertical longitudinal sectional view of the connected elements illustrated in FIGURES 7, said figure also being fragmentary in the same respect as FIGURE 7.

In describing the details of the structures illustrated in the foregoing figures, it is to be understood that, primarily, the same are shown to represent certain basic principles of the invention, without specific restriction to the exact structures and elements illustrated therein. Further, while the present invention principally is highly beneficial for use with flat electric cables of relatively small size, it is to be understood that the principles of the invention can be employed with equal facility in regard to cables of larger size, for example.

Referring to FIGURES 1 through 3, a flat cable 10 is illustrated therein in fragmentary manner. The body of the cable preferably is composed of suitable thermoplastic material, a number of synthetic resins presently available being suitable. The cable 10 preferably is of substantially unform width and thickness, and, in accordance with the preferred principles of the present invention, said cable includes a plurality of electrical conductors 12, which, for example, may be strips of copper disposed in parallel, but transversely spaced, relationship within the body of the cable 10, whereby the conductors 12 are electrically insulated relative to each other.

The conductors 12 also are preferably substantially similar and, while they are illustrated as being completely covered by the insulating thermoplastic body material of the cable 10, it is to be understood that, also in accordance with the principles of the invention, the conductors 12 may be affixed to one surface of the insulating body material of the cable 10 so as to be exposed, if desired, such, for example, as by being only partially embedded in one surface of the body material of cable 10. Due to the fact that the conductors are transversely spaced from each other, however, under the latter conditions described, they, nevertheless, would be insulated from each other.

In FIGURE 1, the insulation body material of the cable 10 has ben stripped, appropriately, from the exposed outer ends of the conductors 12, said exposed outer ends being in condition for attachment to other electrical components, such as electric contacts to which said conductors are to be connected. One convenient manner of removing the insulation material from the conductors at one end of a cable of this type is to immerse the end portion of the cable from which the insulating material is to be removed within a bath of molten solder. Such bath is sufficiently hot to melt the insulation from the conductors, and simultaneously such operation advantageously coats the conductors lightly with solder so as to facilitate the electrical connection of the same to contacts or other electrical components. Such operation is known in the trade as "tinning" the ends of the conductors. Thus, two objectives are accomplished by a single operation.

Particularly when the cable 10 is very thin and only as wide as necessary to support a plurality of conductors 12 of low current-carrying capacity, whereby said conductors are very thin and therefore quite fragile, the cable does not have great tensile strength and, particularly in regard to connecting such cable to another electrical element, such as a housing having contacts therein, it is preferred that such tensile strength as the cable possesses should not be sacrificed in any way. Further, it is preferred that the cable should be connected in such manner that it is capable of resisting reasonable flexing, without injury to the conductors.

To achieve these desired objectives, one of the principal purposes of the present invention is to provide strain-relief means within the cable, and also in the electrical means, such as a housing described hereinafter, to which the cable is to be connected. A convenient form of strain-relief means to be used in the cable comprises a plurality of recess means 14, which, in the specifically illustrated embodiment shown in the various figures, is in the form of a plurality of short slots extending longitudinally of the cable 10.

With reference to FIGURES 2 and 3, it will be seen that the slot-like recess means 14 extend entirely through the cable 10 and, as particularly shown in FIGURE 3, said recess means extend through those portions of the thermoplastic strip material of the cable 10 which is disposed between the transversely spaced electrical conductors 12. Ideally, the conductors 12 should remain coated on all surfaces with the insulating thermoplastic base material of the cable 10 after the formation of the recess means 14 therein; but, as will be seen hereinafter, even if the side edges of certain of the conductors are exposed, incident to forming the recess means 14 within the cable 10, said conductors will remain insulated, even when connected to the other electric element, such as a housing containing contacts, to be described hereinafter.

It also is to be understood that it is not necessary for the recess means 14 to extend entirely through the cable 10, since recesses of less depth than the thickness of the cable and of suitable shapes may be formed within the insulating thermoplastic material of the housing so as to extend inward from one surface thereof and be capable of receiving interlocking, complementary projection means on the electric component, such as a housing, to which the cable is to be connected.

Further, in accordance with the principles of the present invention, the recess means 14 are formed within the thermoplastic insulating material of the cable 10 by fusing the thermoplastic material in localized areas where the strain-relief means 14 are to be formed and, rather than removing any of the thermoplastic insulating material from the cable in such operation, such material is merely reshaped or re-formed, preferably into a grommet-like projection 16 which surrounds the perimeter of the recess means 14 and preferably is smoothly rounded. Further, when the recess means 14 comprise, for example, an elongated slot extending entirely through the cable 10, the grommet-like projection 16 is formed so as to extend from opposite flat surfaces of the cable 10, as clearly shown in FIGURES 2 and 3. Further, in addition to said projections being rounded as clearly shown in said figures and as can be seen in plan view, particularly from FIGURE 1, the ends of the recess means 14 are concavely rounded, thereby providing maximum strength and resistance to fracture.

As a result of forming the recess means 14 within the cable 10 by fusion, whereby substantially none of the material is removed from the cable, but rather the fused material forms a projection or accretion, either at one or both surfaces of the cable, depending upon whether such recess means extend only partially or entirely through the cable, it will be seen that the cross-sectional area of the cable in the region of the recess means is substantially equal to the cross-sectional area of the cable in the non-recess regions thereof. Accordingly, since none of the material has been removed from the cable incident to forming such strain-relief recess means therein, but the same merely has been relocated or repositioned, preferably around the perimeter of the recess means, the ability of the cable to resist tensile stress is not decreased in the recessed area of the cable. Also, due to the fact that the grommet-like projections or flanges 16 which surround the perimeter of the recess means 14, either at one or both surfaces of the cable, increase the thickness of the walls of the recess means 14 in the cable and, therefore, serve as rigidifying ribs, the ability of the cable to resist flexing in the recessed area actually is increased, as compared with the non-recessed areas of the cable. Advantageously, the smoothly rounded ends of the recess means or slots, especially as reinforced by grommets 16, render the cable highly resistant to tearing, even where the plastic material used is otherwise notch-sensitive.

One simple and very effective mechanism for performing the above-described process of fusing the recess means 14 in the cable 10 is illustrated in FIGURES 4 through 6, to which attention now is directed. Referring to FIGURE 4 particularly, it will be seen that one end of a cable 10, such as shown in FIGURE 1, from which the insulation has been removed from the outer ends of the conductors 12, is about to be inserted in operative position within the mechanism 19 for the formation therein of recess means comprising a portion of strain-relief means of the present invention. The mechanism 18 comprises a suitable base 20 having a channel 22 therein comprising guide means complementary to the sides of the cable 10 so as to receive the cable longitudinally of the guide means.

The outer end of the channel 22 is open, while the opposite end thereof is closed by a stop member 24, which limits the longitudinal insertion of cable 10. Further, clamping means comprising a bar 26 extend across the channel 22, and, preferably, the intermediate portion of the lower surface of bar 26 projects into the channel so as to provide a vertical space slightly less than the thickness of the cable 10, so as to insure frictional engagement between the clamping means 26 and the cable 10 when the cable is positioned within the guide channel 2.

A movable member 28 is pivotally connected at 30 to the base 20, whereby as the member 28 is moved toward and from the base 20, it will always move within a predetermined path. In this regard, it is to be understood that the pivoted arrangement between the base 20 and member 28 is merely to be regarded as exemplary of two relatively movable members which, within the purview of the present invention, could be reciprocally related to each other by appropriate guide means, for example, not shown, which could extend vertically from the base 20 and engage the member 28 so as to cause the same to follow a prescribed path toward and from the base 20.

The member 28 carries a plurality of fusing elements 32, which are transversely spaced apart a predetermined distance corresponding to the center lines of the spaces between the conductors 12 within the cable 10, for example. The fusing elements 32 are arranged to be heated to a sufficiently high temperature that they can melt the thermoplastic body of material of the cable 10. Not only for such heating purposes, but also for molding and shaping purposes, as hereinafter described, the fusing elements 32 may very appropriately comprise a series of evenly spaced convolutions of an electric resistance coil supported between suitable temperature-resistant insulating clamping members 34 and 36, which may be formed from porcelain, for example, or other suitable material.

The fusing elements 32, in accordance with the preferred embodiment of the invention, are heated to a red heat before they engage the thermoplastic body material of cable 10. Such heating of the coils 32 is accomplished by the same being connected, in a suitable electric circuit comprising exemplary conductors 38, shown in FIGURES 4 and 5, which extend to a suitable source of electric current, not shown. When the elements 32 are so heated, member 28 which carries the same is moved toward the guide means 22 within which the cable 10 has accurately been positioned, relative to stop member 24, whereby the elements 32 will engage the cable at the exact location where it is desired to have the recess means 14 formed therein.

To facilitate the engagement of the fusing elements 32 with said cable, in the manner contemplated by the present invention, the guide means 22 is provided with a relief or clearance space 40 extending transversely to the guide channel. As best shown in FIGURE 6, it will be seen that the clearance space 40 receives the outermost ends of the circular or curved fusing elements 32, after the same have passed entirely through the thermosetting base material of the cable 10 to form the recess means 14 therein by displacing and reshaping the material which originally occupied said space into the grommet-like projections 16 surrounding the periphery of the recess means 14 at opposite surfaces of the cable 10.

Forming the fusing elements 32 from convolutions of an electric resistance coil formed from round wire of appropriate composition and electrical resistance is, by design, very beneficial to the formation of the recess means 14 in such manner that the grommet-like projections 16 are formed around the periphery of the recess means 14. Particularly where the recess means 14 is in the nature of an elongated slot extending entirely through the cable 10, it will be seen that as the outermost portion of each of the fusing elements 32 contacts the uppermost surface of the thermoplastic base material of the cable 10, it will commence to fuse said material and force the molded material to opposite sides of the elements 32. Then, as the diverging opposite portions of each of the convolutions of the resistance coils comprising the fusing elements 32 descend into the thermoplastic base material gradually, the walls of the recess means 14 initially formed by the first-engaging portion of the elements 32 will commence to cool, whereby the first-formed accretion of material along the perimeter of the recess means likewise will substantially retain its shape of a grommet-like projection 16, and this will continue as the recess means 14 lengthens incident to the complete descending of the curved convolutions comprising fusing elements 32 is completed. Such descending movement is controlled, especially in its downward direction, by any suitable means, such as an adjustable stop member 42 threadably mounted in base 20 and engageable with the inner surface of member 28, as shown in FIGURE 5.

The curved nature of the convolutions of the electric resistance coil element comprising fusing elements 32 also is advantageous in forming the opposed, concave ends of the slot-like recess means 14, in addition to forming the grommet-like projections 16 around the periphery of the recess means 14, thereby affording maximum resistance to rupture and fracture of the walls defining the recess means 14.

As has been stated hereinabove, the flat cable 10 is to be connected with another electrical element, in accordance with the principles of the invention, such as a housing 44. Such housing is best illustrated in FIGURES 7, 8 and 10. Preferably, said housing is formed by molding suitable synthetic resin, for example, into the desired shape. Appropriate recess means 46 may be formed within the housing 44 for purposes of accommodating, for example, a plurality of female contacts 48, which are best shown in FIGURE 10. Said female contacts 48 are engageable, for example, with blade-like male contacts 50, which are electrically connected, for example, to circuit conductors 52 mounted upon an exemplary printed circuit board 54.

The female contacts 48 have leads 56, which are connected to the exposed ends of the conductors 12 of cable 10, as clearly shown in FIGURE 10. The female contacts 48 otherwise are connected stationarily relative to housing 44 by means not comprising part of the present invention, except to indicate that the contacts 48 are stationarily mounted within housing 44.

Housing 44 also is provided with a transverse portion 58, which is integral with the housing, whereby said portion preferably is formed from insulating material. Integral with and projecting upward from portion 58 are a plurality of projections 60 which, in the preferred embodiment thereof, are provided with opposite sides that taper upward and inward, as clearly shown in FIGURE 8. Said projections also comprise portions of the strain-relief means of the present invention, the same being complementary to the recess means 14 formed in cable 10 to permit the same to extend into, and preferably through, said recess means 14, as also is best shown in FIGURE 8.

Inasmuch as the projections 60 are integral with portion 58 of housing 44, and all of the same are molded from insulating material, the projections 60 comprising part of the strain-relief means of the invention likewise are insulated, and even if any of the surfaces of the conductors 12 of the cable 10 should become exposed incident to the formation of the recess means 14 therein, and assuming further that the projections 60 would contact such exposed surfaces of the conductors 12, said conductors will still be insulated from the other conductors, as well as any of the contacts, or other electrical elements carried by the housing 44. Further, the use of slots as recess means 14 permits the use of relatively thin and long projections 60, whereby the same have substantial strength, especially to withstand longitudinal tension, yet need only occupy a very narrow space transversely of the cable, thus minimizing the width of the cable.

Housing 44 also is provided with securing means, which, in the particularly specific illustration of the drawings of the application, comprises a cover member 62, which is detachably connected to the upper portion of housing 44, such as by ribs 64, which are formed on opposite edges thereof and are received in complementary grooves 66 formed in opposed walls of the housing 44. The lower surface of one end portion of the securing means 62 closely overlies the upper surface of cable 10 when supported upon transverse portion 58 of housing 44. In the preferred construction, said lower surface of securing means 62 has a plurality of ribs 68 formed thereon, see FIGURE 8, which respectively directly contact the upper surfaces of the grommet-like projections 16 on the adjacent surface of cable 10 so as to firmly clamp the cable against transverse portion 58. Further, this arrangement insures the accurate and complete positioning of projections 60 within the recess means 14 within the cable, whereby the complementary strain-relief means comprising such projections 60 and recess means 14 closely but detachably engage each other to effectively resist longitudinal movement of the cable relative to the housing 44.

Preferably, as best shown in FIGURE 9, the securing means 62 is detachably latched or locked in the operative position thereof shown in FIGURE 7. This may be accomplished conveniently through the expedient of a preferably cam-shaped locking detent 69, which effectively may engage one of the projections 60, as best shown in FIGURES 8 and 9. Disengagement of the securing means 62 from the housing 44 may be accomplished by slightly flexing the securing means 62 to cause the locking detent 69 to ride over the upper surface of projections 60 with which it has been in engagement.

From the foregoing, it will be seen that the present invention provides strain-relief means for use in a flat cable, whereby, when said cable is connected to another electric element, such as a housing, containing contacts or the like, with which the conductors of the cable are electrically connected, the tensile strength of the cable is in no way diminished and with regard to resisting damage from either normal or abnormal flexing of the cable relative to the housing, such strain-relief means render the cable even more resistant to such possible damage from flexing than other areas of the cable. The process of forming at least portions of the strain-reliief means in the cable, by fusing, results in a preservation of all of the thermoplastic material of the cable, although parts of such material are reshaped or relocated in a manner to afford the advantages set forth above. At least one simple but effective embodiment of mechanism for performing the process of the present invention to provide the portions of the strain-relief means in the cable, likewise, is included as part of the present invention.

While the invention has been described and illustrated in its several preferred embodiments, it should be understood that the invention is not to be limited to the precise details herein illustrated and described, since the same may be carried out in other ways falling within the scope of the invention as claimed.

We claim:
1. Mechanism for forming recess means in an elongated flat cable strip of substantially uniform width and thickness formed from thermoplastic material and having a plurality of parallel conductors therein transversely spaced therein in insulated relationship, said mechanism comprising means to support and position said cable strip, a member mounted movably relative to said supporting means, a plurality of fusing elements supported by said member in predetermined spaced relationship corresponding to the spaces between the conductors of said cable and movable by said member into engagement with said cable when positioned upon said supporting means, means connected to said fusing elements and operable to heat the same simultaneously to fuse recess means within the thermoplastic material of said cable, a guideway formed on the support means and operable to receive a predetermined portion of the cable in which recess means are to be formed, said guideway also including a relief space to accommodate said fusing elements after passing through the cable to form the recess means therein extending through the cable, stop means on said support means operable to be abuted by an end of the cable when positioned in said guideway, and clamping means on said support means operable to secure the cable releasably in said guideway for engagement by said fusing elements.

2. In a mechanism for perforating a strip of thermoplastic material, positioning means for the strip, a member movable toward said positioning means, and fusing element means operable when heating to melt through and form a series of spaced slots extending longitudinally of the strip, said fusing element means comprising transversely spaced and integrally connected convolutions of an electrical resistance coil of wire, said convolutions providing spaced loops projecting from said member and exposed to engage directly the strip, the major axis of said coil extending transversely of the strip as positioned on said positioning means.

References Cited by the Examiner
UNITED STATES PATENTS

| 1,763,255 | 6/1930 | Rankin. | |
| 1,784,217 | 12/1930 | Berry. | |
| 2,597,726 | 5/1952 | Hall | 264—154 X |
| 2,629,899 | 3/1953 | Aller. | |
| 2,729,696 | 1/1956 | Mapelsden et al. | 174—117.1 |
| 2,748,863 | 6/1956 | Benton. | |
| 3,131,425 | 4/1964 | Jacobs | 264—145 X |

ALFRED L. LEAVITT, *Primary Examiner.*

JOHN P. WILDMAN, ROBERT F. WHITE, R. F. ROTELLA, R. B. MOFFITT, *Examiners.*